US011931961B2

United States Patent
Diosdado Borrego et al.

(10) Patent No.: US 11,931,961 B2
(45) Date of Patent: Mar. 19, 2024

(54) OBJECT CLEANING

(71) Applicant: HEWLETT-PACKARD DEVELOPMENT COMPANY, L.P., Spring, TX (US)

(72) Inventors: Jorge Diosdado Borrego, Sant Cugat del Valles (ES); Berta Carbonell Vilaplana, Sant Cugat del Valles (ES); Rhys Mansell, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 143 days.

(21) Appl. No.: 17/595,204

(22) PCT Filed: Sep. 30, 2019

(86) PCT No.: PCT/US2019/053761
§ 371 (c)(1),
(2) Date: Nov. 11, 2021

(87) PCT Pub. No.: WO2021/061167
PCT Pub. Date: Apr. 1, 2021

(65) Prior Publication Data
US 2022/0219397 A1    Jul. 14, 2022

(30) Foreign Application Priority Data
Sep. 25, 2019  (WO) ............... PCT/US2019/052909

(51) Int. Cl.
B29C 64/35    (2017.01)
B08B 5/02     (2006.01)
(Continued)

(52) U.S. Cl.
CPC .............. *B29C 64/35* (2017.08); *B08B 5/02* (2013.01); *B08B 5/023* (2013.01); *B08B 5/04* (2013.01);
(Continued)

(58) Field of Classification Search
CPC ..... B29C 64/35; B29C 64/153; B29C 64/165; B29C 64/357; B08B 5/02; B08B 5/023;
(Continued)

(56) References Cited

U.S. PATENT DOCUMENTS 1,772,492 A    8/1930  Lake
5,782,252 A    7/1998  Lewis et al.
(Continued)

FOREIGN PATENT DOCUMENTS

CN    108050824    5/2018
CN    209304994    8/2019
(Continued)

Primary Examiner — Alexander Markoff
(74) Attorney, Agent, or Firm — Shook, Hardy & Bacon L.L.P.

(57) ABSTRACT

According to one aspect, there is provided a method of cleaning a 3D object on a platform. The method comprises generating with a cleaning module a cleaning airflow to remove powder particles from a 3D object and an extraction airflow to extract any removed powder particles, determining a quantity of powder particles in the extraction airflow, and moving the cleaning module relative to the platform based on the determined quantity of powder particles.

20 Claims, 3 Drawing Sheets

(51) Int. Cl.
  *B08B 5/04* (2006.01)
  *B08B 13/00* (2006.01)
  *B08B 15/04* (2006.01)
  *B22F 10/30* (2021.01)
  *B22F 10/68* (2021.01)
  *B33Y 40/20* (2020.01)

(52) U.S. Cl.
  CPC .............. *B08B 5/043* (2013.01); *B08B 13/00* (2013.01); *B08B 15/04* (2013.01); *B22F 10/30* (2021.01); *B22F 10/68* (2021.01); *B33Y 40/20* (2020.01)

(58) Field of Classification Search
  CPC ........... B08B 5/04; B08B 5/043; B08B 13/00; B08B 15/04; B22F 10/30; B22F 10/68; B22F 2999/00; B22F 10/66; B33Y 40/20; B33Y 10/00
  See application file for complete search history.

(56) References Cited

U.S. PATENT DOCUMENTS

| | | | |
|---|---|---|---|
| 7,045,738 B1* | 5/2006 | Kovacevic | B23K 26/342 219/121.64 |
| 7,435,368 B2 | 10/2008 | Davidson et al. | |
| 7,828,022 B2 | 11/2010 | Davidson et al. | |
| 8,017,055 B2 | 9/2011 | Davidson et al. | |
| 8,827,681 B2 | 9/2014 | Chen et al. | |
| 9,908,819 B1 | 3/2018 | Kollenberg | |
| 9,987,805 B2 | 6/2018 | Foley et al. | |
| 10,046,552 B2* | 8/2018 | Swartz | B29C 64/188 |
| 10,189,057 B2* | 1/2019 | Craft | B08B 7/04 |
| 10,391,712 B2 | 8/2019 | Hoover et al. | |
| 2001/0045678 A1* | 11/2001 | Kubo | B29C 64/35 425/375 |
| 2002/0090410 A1* | 7/2002 | Tochimoto | B29C 64/357 425/215 |
| 2004/0084814 A1 | 5/2004 | Boyd et al. | |
| 2012/0052145 A1* | 3/2012 | Chen | B22F 10/73 425/217 |
| 2013/0052291 A1* | 2/2013 | Morikawa | B33Y 40/20 425/135 |
| 2015/0266211 A1 | 9/2015 | Wolfgang et al. | |
| 2017/0036377 A1 | 2/2017 | Baghdadi et al. | |
| 2017/0363777 A1 | 12/2017 | Phillips | |
| 2019/0022942 A1* | 1/2019 | Fulop | B29C 64/357 |
| 2019/0176402 A1* | 6/2019 | Hofmann | B29C 64/153 |

FOREIGN PATENT DOCUMENTS

| | | |
|---|---|---|
| CN | 110193940 | 9/2019 |
| RU | 2524603 C2 | 7/2014 |

* cited by examiner

OBJECT CLEANING

BACKGROUND

There exist a multitude of kinds of three-dimensional (3D) printing techniques that allow the generation of 3D objects through selective solidification of a build material based on a 3D object model.

One technique forms successive layers of a powdered or granular build material on a build platform in a build chamber, and selectively applies a curable binder agent on regions of each layer that are to form part of the 3D object being generated. The curable binder agent has to be cured to form a sufficiently strong so-called 'green part' that may be removed from the build chamber, cleaned up, and then sintered in a sintering furnace to form the final 3D object.

BRIEF DESCRIPTION

Examples will now be described, by way of non-limiting example only, with reference to the accompanying drawings, in which.

DETAILED DESCRIPTION

To enable 3D printing systems to move from their currently generally low throughput object generation capabilities to high throughput object generation capabilities many of the currently manually performed processes will have to be transformed into automated processes. Cleaning of 3D printed objects is one of those processes.

In binder jet 3D printing, for example, successive layers of a powder, such as a metal powder, are formed on a build platform in a build chamber. A binder agent based is selectively printed on each layer based on a layer of the 3D object to be generated. The binder agent may then be cured, for example by applying heat or by applying ultraviolet light, to generate what is generally known as a green part. A green part is formed from powder particles that are bound together with the binder agent in relatively weak matrix. A green part may be sintered in a sintering furnace where binder agent is burned off, and the powder particles sinter together to form a highly dense final object.

Due to various issues, that may include issues such as binder agent carrier liquid leakage, when a green part is extracted from a build chamber there is often some volume of non-bound powder that adheres to the green part. Before a green part can be sintered, however, all powder adhering to the surface of the green part has to be removed otherwise it will become part of the final object after sintering. However, due to the relatively weak nature of green parts it is challenging to ensure removal of non-bound powder without damaging the green part.

Figure 1A:
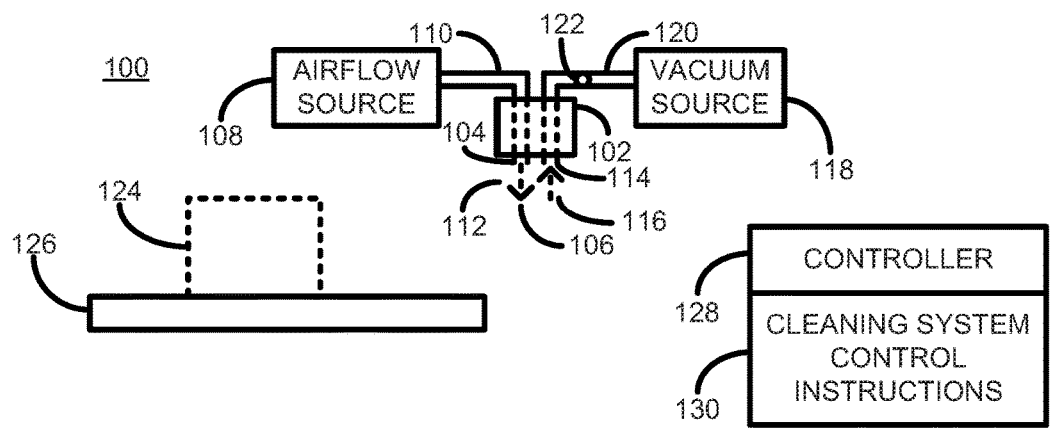
FIG. 1A is a simplified side view of a cleaning apparatus according to an example.
Figure 1B:
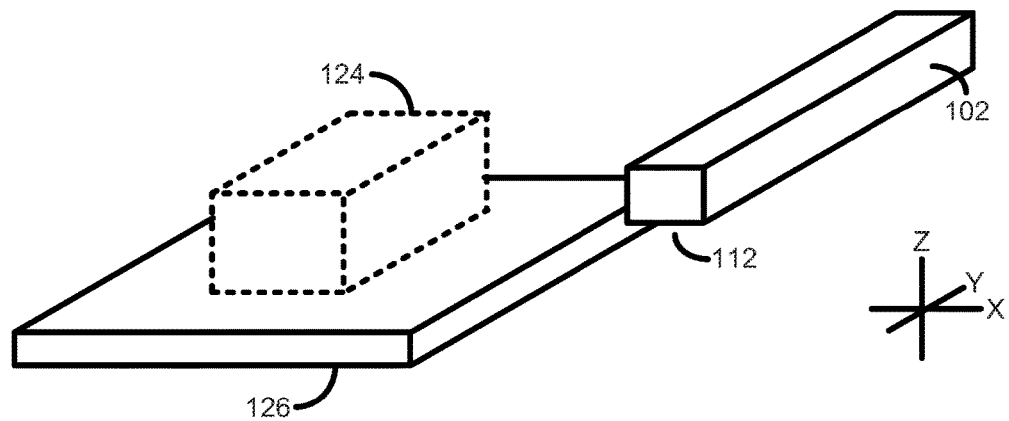
FIG. 1B is a simplified isometric view of a cleaning apparatus according to an example.

Referring now to FIG. 1A, there is illustrated a simplified side view of cleaning system 100 according to one example. FIG. 1B illustrates a corresponding simplified isometric view. The system 100 comprises a cleaning module 102 that houses an output, or cleaning, port 104 to direct a first airflow 106 generated from an airflow source 108 through a first conduit 110 to a cleaning zone 112. The cleaning module 102 also houses an input, or extraction, port 114 to direct a second extraction airflow 116, generated by a vacuum source 118, from the cleaning zone 112 through a second conduit 120 to the vacuum source.

Figure 1C:
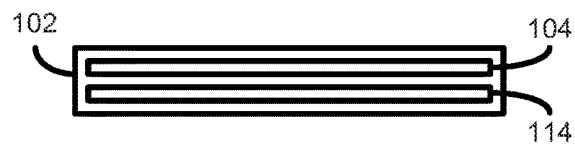
FIG. 1C is a simplified bottom view of a portion of a cleaning apparatus according to an example.

A bottom view of the cleaning module 102 is illustrated in FIG. 1C. In the example shown, the cleaning module 102 is configured as and functions as an air knife having a longitudinally aligned output port 104 adjacent to a longitudinally aligned input port 114. The length of the ports 104 and 114 span the width along the y-axis of a platform 126, as shown in FIG. 1B. In one example the output port 104 allows a narrow high-speed laminar air flow to be generated within the cleaning zone 112.

The cleaning module 102 generates, in conjunction with the airflow source 108 and vacuum source 118, an outward cleaning airflow into the cleaning zone 112, and generates an inward extraction airflow from the cleaning zone 112. The outward cleaning airflow 106 is to remove, through the action of a high speed air flow, powder particles adhered to a portion of an object within the cleaning zone and the inward extraction airflow 116 is to extract any powder particles removed by the cleaning airflow 106 from the cleaning zone 112. The strength of the airflow 106 may be configured to adequately remove adhered powder particles from a 3D object, whilst not causing damage to the 3D object. The strength of the airflow 106 may be configured, for example, based on an expected distance between the output port 104 and a portion of a 3D object within the cleaning zone 112, and based on the strength of the green part. The strength of the extraction airflow 116 may be configured to adequately extract powder particles removed by the airflow 106 to the vacuum source.

The size of the effective cleaning zone 112 may vary, for example, depending on the strength of the airflows 106 and 116, and the nature of the ports 104 and 114.

Within conduit 120 is provided a sensor 122 to determine a quantity of powder particles within the conduit 120. In one example, a charge sensor may be provided to determine a concentration of metal powder particles within the conduit 120. In another example, a light-based particle sensor may be provided to determine a concentration of plastic powder particles within the conduit 120. Although not shown in FIG. 1, between the sensor 122 and the vacuum source 118 a filter or powder particle removal system, such as a cyclone, may be provided to remove powder particles from the extraction airflow 116 before they reach the vacuum source 118.

The cleaning system 100 also comprises a platform 126 on which a 3D object, such as object 124, may be placed for cleaning by the cleaning module 102. Relative movement between the platform 126 and the cleaning module 102 may be imparted to allow the system to clean an object 124 positioned on the platform 126 in an automated manner. In the example shown the platform 126 is a platform that is moveable along the x-axis. In one example, the platform 126 is a moveable platform, such as a conveyor belt, a moveable platform mounted on rails, or the like.

A controller 128, such as microcontroller or microprocessor, is coupled to the airflow source 108, the vacuum source 118, and the platform 126 to control the operation of the cleaning system 100 in accordance with cleaning system control instructions 130 stored on a machine-readable media such as a memory. The cleaning system control instructions 130 are machine-readable instructions that, when executed by the controller 128, cause the controller 128 to control the system 100 as described herein.

Figure 2:
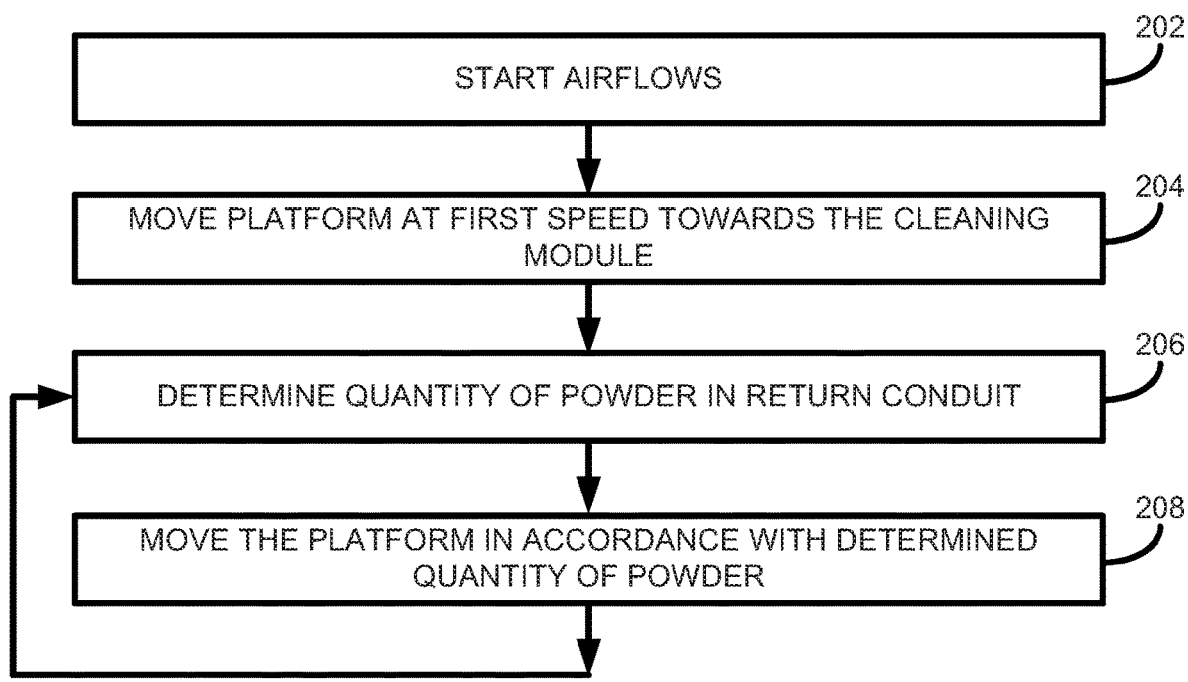
FIG. 2 is a flow diagram outline an example method of operating a cleaning apparatus.

Operation of the cleaning system 100 according to one example will now be described with additional reference to the flow diagram of FIG. 2.

A 3D object, such as a green part, is placed on the platform 126. The object may be placed on the platform 126 by an automated system, such as a conveyor belt or a robotic arm, or by a human operator. The height of cleaning module 102 may be adjusted based on the height of the 3D object to be cleaned such that as the 3D object is moved under the cleaning module portions of the object pass through the cleaning zone 112.

At block 202, the controller 128 controls the airflow source 108 to create the output airflow 106 and controls the vacuum source 118 to create the extraction airflow 116.

At block 204, the controller 128 controls the platform 126 to move towards the cleaning module 102 at a first speed. When the first portion of the object 124 is within the cleaning zone 112 the output airflow 106 starts to dislodge and remove powder particles adhered to the first portion of the object 124, and the extraction airflow 116 evacuates any removed powder particles towards the vacuum source 118. The extraction of removed powder particles helps prevent those particles from abrasively damaging the green part. The sensor 122 generates a signal, such as an electrical or digital signal, in accordance with the quantity of powder particles detected in the extraction airflow 116. In one example, the controller 128 starts the airflows 106 and 116 when the object is within the cleaning zone 112. This may be achieved, for example, by way of a proximity sensor (not shown) located on the cleaning module 102, or in any other suitable manner.

At block 206, the controller determines the quantity of powder particles in the extraction airflow 116, and at block 208, the controller 128 controls movement of the platform 126 based on the quantity of powder particles detected in the extraction airflow 116.

For example, when a first portion of a 3D object is moved into the cleaning zone 112 the quantity of powder particles in the extraction airflow 116 will start to increase as powder particles that can be removed by the cleaning module 102 are removed. Before the object is moved into the cleaning zone 112 the quantity of particles detected by the sensor 122 will be at or around some ambient level, such as for example at around 8 particles per cm$^3$ depending on the cleanliness of the air. After a short time, the quantity of powder particles in the extraction airflow 116 will start to decrease as there remains less powder to be removed from the green part. In one example, the controller 112 adjusts the movement/speed of the platform 126 to keep the determined quantity of powder particles above a predetermined minimum level. In other words, when the detected quantity of powder particles detected falls below the predetermined minimum level the controller 112 modifies the movement/speed of the platform 126. In one example, the minimum level could be between around 8 to 16 powder particles per cm$^3$. The exact predetermined minimum level may depend on whether the sensor detects particles, such as dust particles, which are not powder particles. In this way, each portion of the 3D object is not exposed to unnecessarily long exposure to the output airflow 106 which could, in some circumstances, damage the green part. Furthermore, each object may pass under the cleaning module 102 to be adequately cleaned at an optimum throughput rate. At the same time, the 3D object is cleaned in an efficient manner without any human intervention. This is particularly useful when multiple 3D objects to be cleaned are place on the platform 126.

In one example, the platform 126 may be continuous conveyor belt and may have objects continually placed thereon by a suitable robotic or other mechanism.

In one example, depending on the determined quantity of powder in the conduit 120 the controller 128 may control the platform 126 to advance in a in a stepwise manner. For example, the controller 128 may control the platform 126 to move forward by a small distance, such as 0.5 cm, or 1 cm, or 2 cm, or 5 cm, or 10 cm, and may stop movement of the platform 126 until the determined quantity of powder in the conduit 120 falls below a predetermined level. The controller 128 may then control the platform 126 to move forward by another predetermined distance.

In another example, the controller 128 may control the platform 126 to advance in continuous manner, whereby the speed of the platform advance is based on the determined quantity of powder in the conduit 120. For example, when the quantity of determined powder in the conduit 120 is relatively high, the speed of the platform may be relatively low, whereas when the quantity of determined powder in the conduit 120 is relatively low the speed of the platform may be relatively high.

Figure 3:
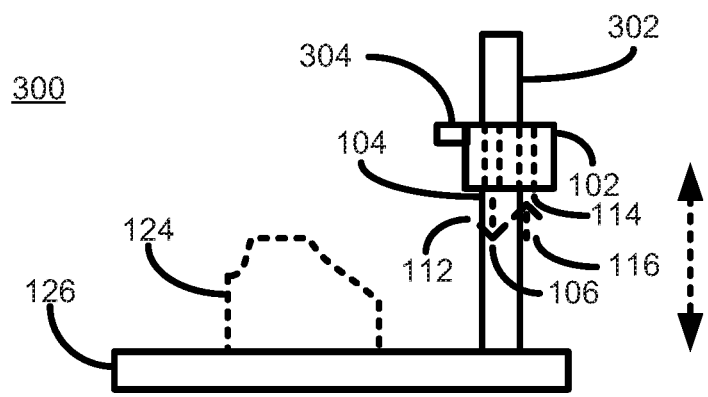
FIG. 3 is a simplified side view of a cleaning apparatus according to an example.

Referring now to FIG. 3, there is illustrated a side view of a cleaning apparatus 300 according to an example. In this example, the cleaning module 102 is height adjustable, allowing the cleaning module to be vertically raised and lowered. In the example shown, a vertical rail 302 is provided on which the cleaning module 102 may be raised and lowered, for example using a motor or a servo. A height sensor 304 is also provided to enable the distance between the cleaning module 102 and a 3D object 124 to be determined. In the example shown, the height sensor 304 is coupled to one side of the cleaning module 102, although in other examples a height sensor may be positioned elsewhere. In one example a laser or an ultrasonic height sensor may be used. By allowing the cleaning module 102 to be height adjustable enables 3D objects that have non-uniform geometries to be cleaned in an efficient manner, by automatically keeping each portion of a 3D object within the cleaning zone 112.

In a further example, the cleaning apparatus 300 may modify the strength of the cleaning airflow 106 and/or the extraction airflow 116 without adjusting the height of the cleaning module 102 to vary the size of the cleaning zone 112 based on the distance between cleaning module 102 and a portion of the 3D object 124 being cleaned.

Figure 4A:
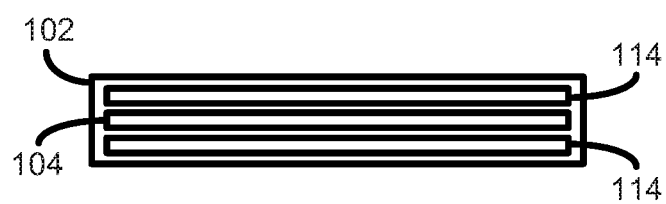
FIGS. 4A and 4B are simplified bottom views of a portion of a cleaning apparatus according to an example.

The cleaning module 102 may be configured in numerous ways. For example, as shown in FIG. 4A, the cleaning module 102 may comprise a pair of extraction ports 114 that sandwich between them an output port 104. In this way two extraction airflows 116 would be generated within the cleaning zone 112.

Figure 4B:
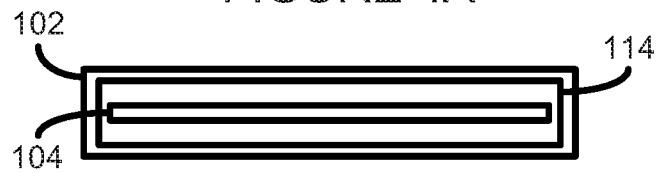

In a further example, illustrated in FIG. 4B, the cleaning module 102 may comprise an extraction port 114 that surrounds the output port 104.

In a further example, the cleaning apparatus 300 may comprise a plurality of height adjustable cleaning modules 302 arranged in an in-line configuration. In this example, the controller 128 can control the height of each of the plurality of the cleaning modules 302 based on the distance between each of the plurality of cleaning modules and between a respective portion of a 3D object in proximity thereto. Such an arrangement may be useful when a 3D object to be cleaned has an irregular shape.

In a further example, the cleaning module 102 may be oriented at a fixed angle, such as an angle of 20 degrees, or 30 degrees, or 40 degrees, or 50 degrees, to the vertical, such that the cleaning zone 112 is oriented towards the leading portion of the 3D object as it is moved by the platform 126. In a yet further example, the cleaning module 102 may be rotationally orientable, for example under control of the controller 128, to adjust its orientation based on the geometry of the portion of the 3D object being cleaned. For example, the controller may use one or multiple sensors to orientate the cleaning module 102 such that the output airflow hits the portion of the 3D object in the cleaning zone within a predetermined angle of the surface normal of the object portion. In another example the controller 128 may adjust the orientation of the cleaning module 102 based, for example, on a predetermined rotational sweeping movement of the cleaning module 102.

Although the examples described above describe a movable platform 126 to move 3D printed objects under the cleaning module 102, in other examples the platform 126 could be static and the cleaning module 102 could be moveable along the x-axis relative to the platform 126. In other examples, both the platform 126 and the cleaning module 102 could be movable along the x-axis.

It will be appreciated that example described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, some examples provide a program comprising code for implementing a system or method as claimed in any preceding claim and a machine-readable storage storing such a program. Some examples may be conveyed electronically via any medium such as a communication signal carried over a wired or wireless connection.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A system for cleaning a 3D printed object, comprising:
   a platform to receive the 3D printed object to be cleaned;
   a cleaning module comprising:
   an output port to direct a first airflow from an airflow source to the 3D printed object on the platform; and
   an extraction port adjacent to the output port to direct a second airflow comprising powder particles removed by the first airflow to a vacuum source;
   a sensor to measure a quantity of powder particles removed by the second airflow; and
   a controller to control movement of the platform, while cleaning the 3D printed object via the cleaning module, based on the quantity of powder particles measured by the sensor.

2. The system of claim 1, wherein the platform is a moveable platform to move 3D objects placed on the platform through a cleaning zone of the cleaning module, and wherein the controller is to:
   control the airflow source to generate the first airflow at a first predetermined flow rate;
   control the vacuum source to generate the second airflow at a second predetermined flow rate;
   control the platform to position a first portion of the 3D printed object within the cleaning zone of the cleaning module; and
   control the platform to move the 3D printed object on the platform through the cleaning zone at a speed based on the quantity of powder particles removed by the second airflow.

3. The system of claim 1, wherein the platform is a moveable platform to move 3D objects on the platform through a cleaning zone of the cleaning module, and wherein the controller is to:
   control the airflow source to generate the first airflow at a first predetermined flow rate;
   control the vacuum source to generate the second airflow at a second predetermined flow rate;
   control the platform to position a first portion of the 3D printed object within the cleaning zone of the cleaning module; and
   control the platform to move the 3D printed object on the platform through the cleaning zone in a series of discrete steps based on the quantity of powder particles removed by the second airflow.

4. The system of claim 1, wherein the cleaning module is height adjustable based on a distance between the cleaning module and a portion of the 3D printed object on the platform, the distance determined via a height sensor.

5. The system of claim 1, wherein the cleaning module is an air knife to generate a narrow high-speed laminar air flow within a cleaning zone of the cleaning module.

6. The system of claim 1, wherein the sensor is a charge sensor to detect a quantity of metal powder particles or is a light-based sensor to detect a quantity of plastic powder particles in the second airflow.

7. The system of claim 1, wherein a cleaning zone of the cleaning module is orientated towards a leading edge of the 3D printed object as it is moved by the platform, such that the first airflow hits the leading edge of the 3D printed object.

8. The system of claim 1, wherein the cleaning module is rotationally orientable, and wherein the controller is configured to adjust an orientation of the cleaning module based on a geometry of a portion of the 3D printed object.

9. The system of claim 1, wherein the cleaning module comprises one of:
   a pair of extraction ports, including the extraction port, that sandwich between them the output port; and
   the extraction port that surrounds the output port.

10. A method of cleaning an object on a platform, comprising:
    generating with a cleaning module a cleaning airflow to remove powder particles from the object and an extraction airflow to extract any removed powder particles;
    determining a quantity of powder particles in the extraction airflow; and moving the cleaning module relative to the platform based on the quantity of powder particles while cleaning the object via the cleaning module.

11. The method of claim 10, wherein moving the cleaning module relative to the platform comprises controlling a speed of the platform towards the cleaning module, wherein the speed of the platform is inversely proportional to the quantity of powder particles.

12. The method of claim 10, wherein moving the cleaning module relative to the platform comprises controlling a speed of the platform towards the cleaning module using a proximity sensor located on the cleaning module.

13. The method of claim 10, further comprising modifying a distance between the cleaning module and the object to maintain a portion of the object within a cleaning zone of the cleaning module.

14. The method of claim 10, further comprising generating the cleaning airflow at an angle between about 20 and 50 degrees towards the object.

15. The method of claim 10, further comprising changing an orientation of the cleaning airflow based a geometry of a portion of the object.

16. One or more non-transitory machine-readable media having computer-executable instructions embodied thereon, that when executed by at least one processor, cause the at least one processor to perform a method comprising:
   causing, via a controller, a cleaning module to generate a cleaning airflow to remove powder particles from an object on a platform;
   causing, via the controller, the cleaning module to generate an extraction airflow to extract the powder particles removed from the object by the cleaning airflow;
   determining a quantity of powder particles in the extraction airflow based on using a sensor; and
   causing, via the controller, the platform to move relative to the cleaning module based on the quantity of powder particles determined.

17. The one or more non-transitory machine-readable media of claim 16, the method further comprising determining that the quantity of powder particles includes dust, and causing the cleaning module to move relative to the platform and at a particular speed based on determining that the quantity of powder particles includes dust.

18. The one or more non-transitory machine-readable media of claim 16, the method further comprising using a plurality of sensors, including the sensor, to orient the cleaning module to direct the cleaning airflow at an angle between about 20 and 50 degrees towards a leading portion of the object.

19. The one or more non-transitory machine-readable media of claim 16, the method further comprising using a plurality of sensors, including the sensor, to orient the cleaning module to direct the cleaning airflow towards a leading portion of the object based on a geometry of the object detected using the plurality of sensors.

20. The one or more non-transitory machine-readable media of claim 16, the method further comprising determining that the quantity of powder particles in the extraction airflow is above a threshold and causing a speed of the platform, moving relative to the cleaning module, to be reduced based on determining that the quantity of powder particles in the extraction airflow is above the threshold.

* * * * *